United States Patent [19]

Bowers

[11] Patent Number: 5,716,180

[45] Date of Patent: Feb. 10, 1998

[54] ADJUSTABLE QUICK CONNECT FASTENER FOR ACCOMMODATING PANELS OF VARIOUS THICKNESSES

[76] Inventor: Ned C. Bowers, 7400 Ola Cir., Mt. Dora, Fla. 32757

[21] Appl. No.: 550,369

[22] Filed: Oct. 30, 1995

Related U.S. Application Data

[63] Continuation-in-part of Ser. No. 309,685, Sep. 21, 1994, abandoned.

[51] Int. Cl.⁶ ............................ F16B 21/00; F16B 21/02
[52] U.S. Cl. ..................... 411/551; 411/553; 411/555
[58] Field of Search ............................ 411/216, 217, 411/551, 552, 553, 554, 555, 948

[56] References Cited

U.S. PATENT DOCUMENTS

| 442,642 | 12/1980 | Roby | 411/217 |
|---|---|---|---|
| 1,387,172 | 8/1921 | Postel | 411/948 |
| 2,922,211 | 1/1960 | Boyd | 411/551 |
| 3,488,815 | 1/1970 | Metz | 411/555 |

FOREIGN PATENT DOCUMENTS 462482  3/1937  United Kingdom .

Primary Examiner—Steven N. Meyers
Assistant Examiner—Robert G. Santos
Attorney, Agent, or Firm—Lane, Aitken & McCann

[57] ABSTRACT

A fastener for holding panels together includes a grommet for engaging a first panel, a stud received in the grommet, and a receptacle for securement to a second panel, wherein the receptacle includes a body having an internally threaded bore, an externally threaded barrel member in engagement with the threads of the bore, curved slots in the barrel member for receiving a cross pin of the stud, and a mechanical arrangement for selectively locking the barrel member from movement relative to the body. The grommet may include diametrically opposed slots having open ends extending through an end of the grommet for receiving the cross pin of the stud.

2 Claims, 3 Drawing Sheets

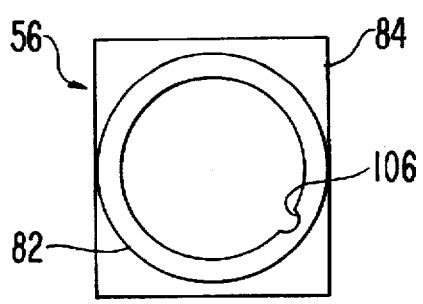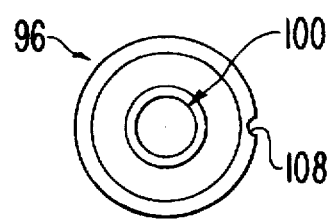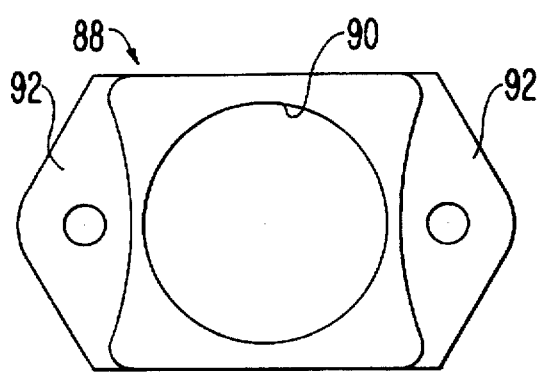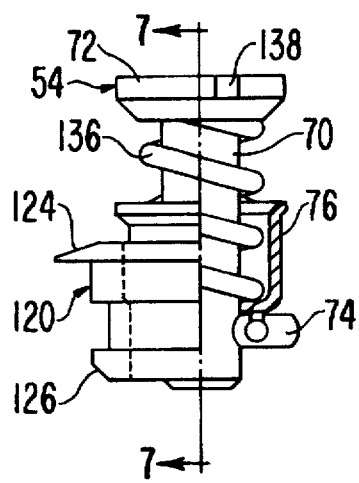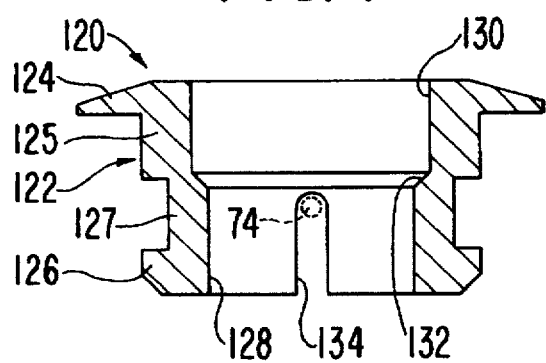

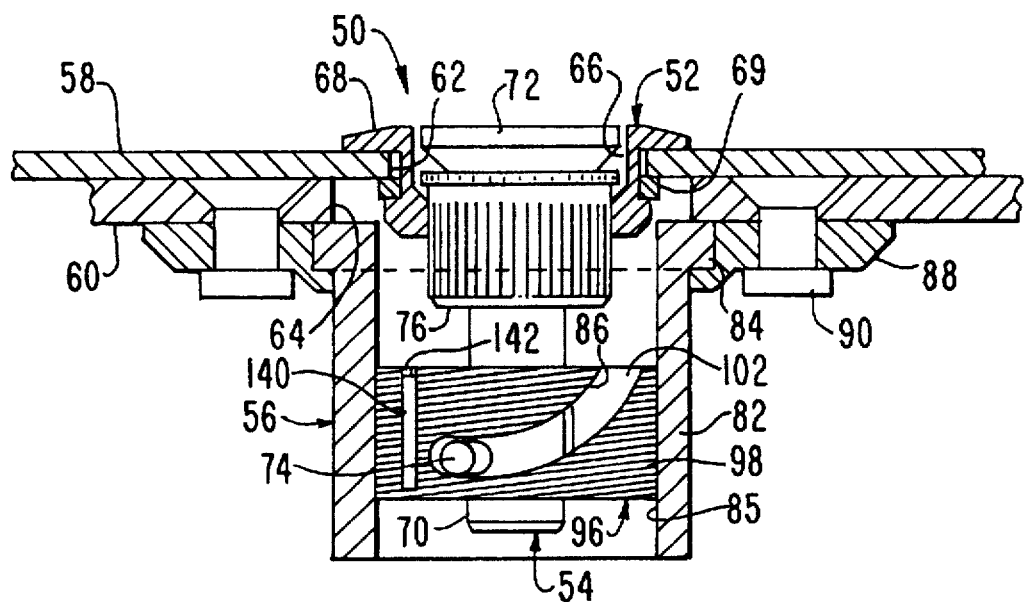
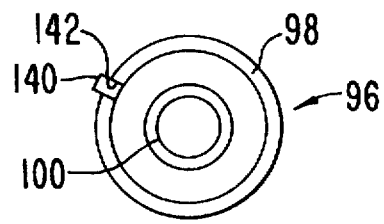
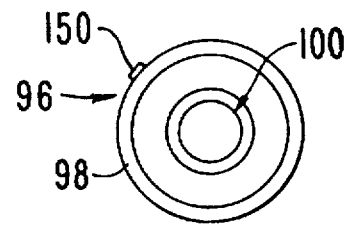
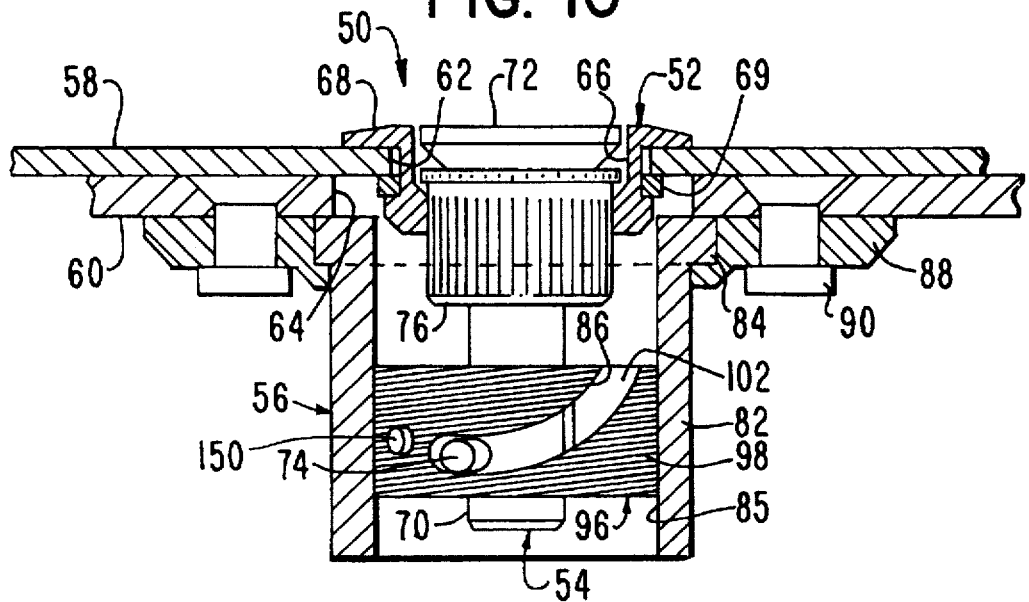

ADJUSTABLE QUICK CONNECT FASTENER FOR ACCOMMODATING PANELS OF VARIOUS THICKNESSES

CROSS REFERENCE TO RELATED APPLICATION

This is a continuation-in-part of Ser. No. 08/309,685, filed on Sep. 21, 1994 now abandoned.

BACKGROUND OF THE INVENTION

The present invention relates to quick connect fasteners for holding panels together and, more particularly, to ¼ turn fasteners which can be fastened and unfastened quickly and repeatedly.

As can be seen from Prior Art FIG. 1, fasteners 10 of the ¼ turn type have been known which include a grommet 12, a stud 14 and a receptacle 16. The fastener 10 holds together two panels 18 and 20, with adjacent sides of the panels in contact with one another, by extending through openings 22 and 24 formed in the panels to receive the fastener. The grommet 12 has a cylindrical body 26 sized to extend through the opening 22 in one of the panels 18, usually an outer panel, and one end of the cylindrical body 26 has a radially outward extending flange 28 to engage the outer surface of the outer panel 18. The stud 14 has a shaft 30, a head 32, a cross pin 34 extending through the shaft at an end opposite to the head, a cup member 36 slidable along the shaft and a spring on the shaft between the head and cup member and received in the cup member. The stud 14 is received in the grommet 12, with the head 32 of the stud being adjacent to the flange 28 on the grommet and a radially outward extending flange 38 on the cup member 36 engaging a radially inward extending flange 40 at the end of the grommet 12 opposite to the radially outward extending flange 28. This arrangement keeps the head 32 of the stud 14 biased by the spring slightly outward from the radially outward extending flange 28 at the outer side of the outer panel 18. The cross pin 34 on the stud 14 prevents the assembly of the grommet 12 and the stud 14 from separating from the outer panel 18. Due to the presence of the cross pin 34 and the stiffness of the spring, a tool is required to move the cup member 36 adjacent to the head 32 by compressing the spring and thereby providing sufficient distance between the cross pin and the cup member that the stud can be inserted, at an angle, into the grommet. However, the geometry of this arrangement limits the axial length of the grommets 12 which can be used. Specifically, when the axial length of a grommet 12 reaches a certain magnitude, the stud 14 cannot be inserted into the grommet even when the cup member 36 is adjacent to the head 32.

The receptacle 16 of the fastener 10 has a generally cylindrical body 42 and a flange 44 projecting radially outward from one end of the body. The receptacle body 42 defines a central opening and has cam and locking surfaces 46 defined at an end opposite the radially outward extending receptacle flange 44. The receptacle flange 44 is placed against and secured to a side of the other panel 20, usually an inner panel, opposite to the side contacting the first panel 18, with the receptacle body 42 extending away from the side of the panel 20 to which the flange is attached. The panels 18 and 20 are brought together so that the stud 14 and the receptacle 16 are in alignment. The head 32 of the stud 14 is engaged by a turning tool, such as a screwdriver, pushed inwardly against the bias of the spring, and turned ¼ turn with the cross pin 34 of the stud in engagement with the cam and locking surfaces 46 of the receptacle 16. This action locks the fastener 10 in place with the two panels 18 and 20 in secure engagement with one another.

A drawback of such a fastener is that, for a stud of any particular length, the total thickness of the two panels for which the fastener is effective must lie within a very limited range, typically a range of 0.030 inches. If the total thickness lies outside the range, a longer or shorter stud 14 must be used. If the total thickness lies outside the range by more than a full width of the range, a stud 14 two sizes longer than the first size must be used. Accordingly, for most work, a variety of stud sizes must be purchased and kept on hand.

The outer diameter of the cylindrical body of the grommet is sized to engage the surface defining the opening through the outer panel, so that lateral shifting of the outer panel with respect to the fastener is prevented. As the thickness of the outer panel increases, the length of grommet required increases. However, longer grommets have also required longer studs to enable the cross pin of the stud to pass through the longer grommets, at an angle.

SUMMARY OF THE INVENTION

By the present invention, the drawbacks of the known fasteners have been overcome, and a wide range of panel thicknesses can be accommodated by a ¼ turn fastener in which each component is of a single size.

In order to accomplish this feature of the present invention, the receptacle is adjustable. More particularly, the receptacle includes an internally threaded body and an externally threaded barrel, wherein the threads of the body and the barrel are in engagement with one another so that rotation of the barrel relative to the body moves the barrel axially with respect to the body. Cam and locking surfaces for the cross pin of the stud are defined in the barrel. As a result, the position of the barrel within the receptacle body can be adjusted so that a single length stud can be used, and yet total panel thickness can be varied over a wide range. Where total panel thickness is relatively thin, the barrel can be rotated so that the cam and locking surfaces are relatively far from the receptacle side of the second panel. Where the total panel thickness is relatively thick, the barrel can be turned to attain a position in which the cam and locking surfaces are relatively close to the two panels. In either case, the cross pin of a stud of just one length engages the cam and locking surfaces of the barrel.

In order to positively lock the barrel with respect to the cylindrical body of the receptacle, when the desired position of the barrel has been set, semi-cylindrical grooves of equal diameter are drilled parallel to the axes of the barrel and the cylindrical body in the outer circumference of the barrel and in the inner annular surface of the cylindrical body. With each complete revolution of the barrel relative to the cylindrical body, the drilled grooves are in alignment with one another and, when the desired position of the barrel is achieved, the grooves are aligned and a spring roll pin of appropriate diameter is inserted into the aligned grooves to lock the barrel in the desired position.

In an alternate locking arrangement, the aligned grooves and spring roll pin are omitted in favor of a resilient fixing material interposed between the threads of the barrel and the threads of the cylindrical body. The resilient fixing material prevents movement of the barrel relative to the cylindrical body within the range of forces required to connect or disconnect the fastener. However, at a level of force beyond that required for connection and disconnection of the fastener, the resilient fixing material permits rotation of the barrel relative to the body. The rotation of the barrel changes the distance of the cam and locking surface from the two panels, thereby enabling the fastener to accommodate various panel thickness while using a stud of fixed length. In one disclosed embodiment, the resilient fixing material is in the form of a strip secured to the barrel, and in another embodiment, the resilient fixing material is in the form of a pellet secured in the barrel.

In another aspect of the present invention, the body of the grommet has a structure which permits a relatively short stud to be used with grommets of various length. Furthermore, the structure permits studs of various lengths to be used, if desired. More specifically, the structure involves diametrically opposed slots in the body of the grommet, the slots having open ends through the end of the grommet opposite to the end having the radially outward extending flange.

BRIEF DESCRIPTION OF THE DRAWINGS

FIG. 3 is a bottom plan view of the cylindrical body of the receptacle of the fastener of FIG. 2;

FIG. 4 is a bottom plan view of the barrel of the receptacle of the fastener of FIG. 2;

FIG. 5 is a cage for the receptacle of the fastener of FIG. 2;

FIG. 6 is a front view of an assembly of a grommet according to the present invention with a stud, with the grommet removed from the right side of the drawing and a part associated with the stud shown in cross section;

FIG. 7 is a cross section of the grommet according to the present invention taken along the line 7—7 in FIG. 6;

FIG. 8 is a cross section of a second embodiment of the fastener according to the present invention, with the barrel shown in front elevation;

FIG. 9 is a bottom view of the barrel of the fastener of FIG. 8;

FIG. 10 is a cross section of a third embodiment of the fastener according to the present invention, with the barrel shown in front elevation; and FIG. 11 is a bottom view of the barrel of the embodiment of FIG. 10.

DETAILED DESCRIPTION OF THE PREFERRED EMBODIMENTS

Figure 1:
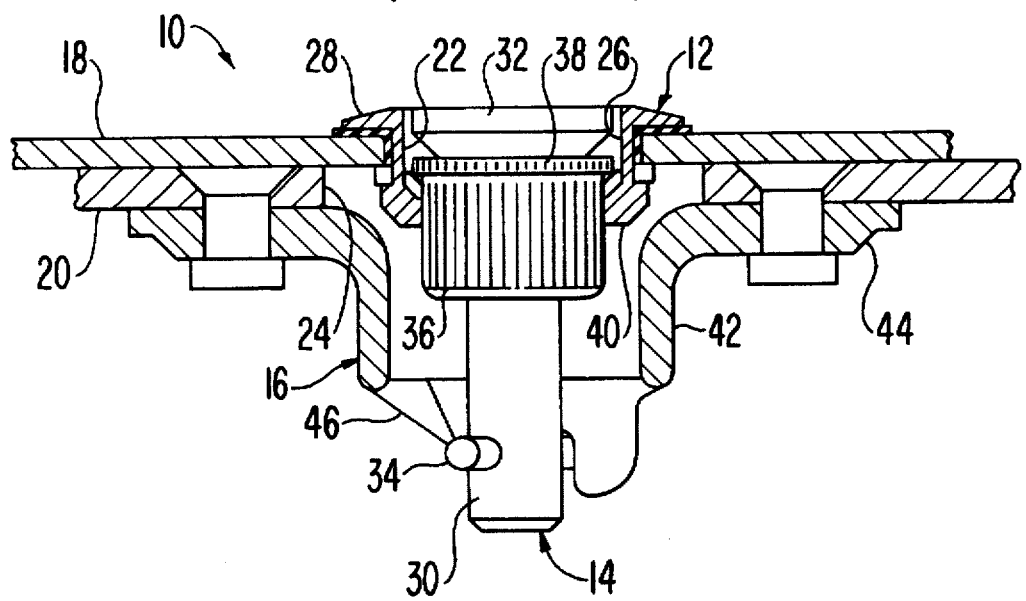
FIG. 1 is a front view of a prior art fastener holding two panels together.
Figure 2:
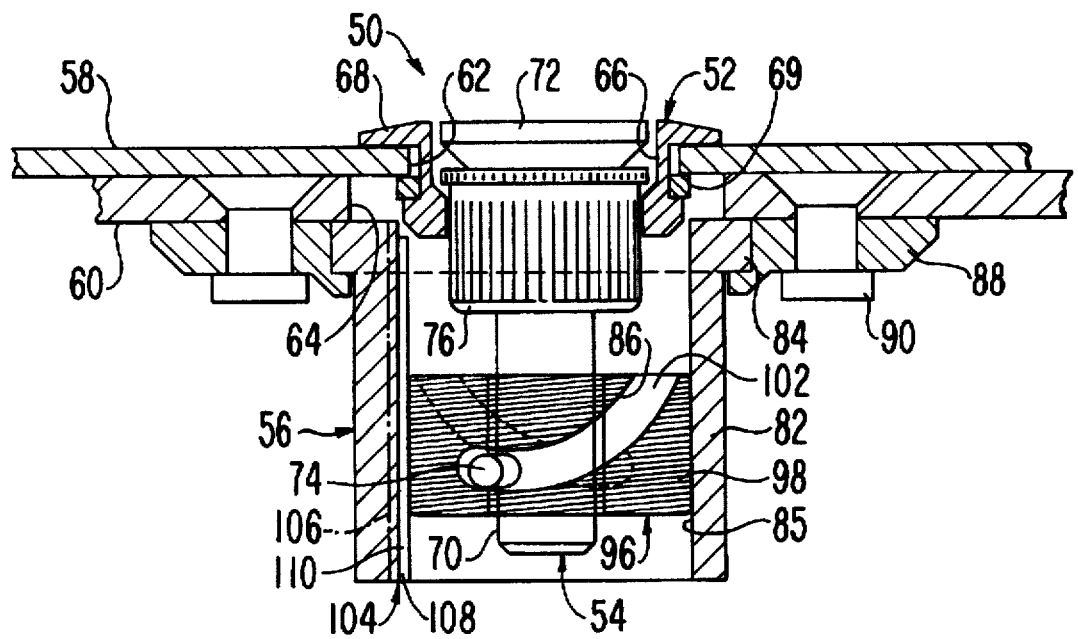
FIG. 2 is a front view of the fastener according to the present invention holding two panels together.

As can be seen from FIG. 2, the adjustable fastener according to the present invention, which is designated generally by the reference numeral 50, is of the ¼ turn type, having a grommet 52, a stud 54, and a receptacle 56. The fastener 50 holds together two panels 58 and 60, with adjacent sides of the panels in contact with one another, by extending through openings 62 and 64 formed in the panels to receive the fastener. The grommet 52 has a cylindrical body 66 sized to extend through the opening 62 in one of the panels 58, usually an outer panel, and one end of the cylindrical body 66 has a radially outward extending flange 68 to engage the outer surface of the outer panel 58. The other end of the cylindrical body 66 has a radially outwardly extending shoulder or flange to engage a retaining ring 69 for retaining the grommet 52 on the outer panel 58. The stud 54 has a shaft 70, a head 72, a cross pin 74 extending through the shaft at an end opposite to the head, a cup member 76 slidable along the shaft and a spring on the shaft between the head and cup member and received in the cup member. The stud 54 is received in the grommet 52 with the head 72 of the stud being adjacent to the flange 68 on the grommet and a radially outward extending flange on the cup member 76 engaging a radially inward extending flange at the end of the grommet 52 opposite to the radially outward extending flange 68. This arrangement keeps the head 72 of the stud 54 biased by the spring slightly outward from the radially outward extending flange 68 at the outer side of the outer panel 58. The cross pin 74 on the stud 54 prevents the assembly of the grommet 52 and the stud 54 from separating from the outer panel 18. Due to the presence of the cross pin 74 and the stiffness of the spring, a tool is required to move the cup member 76 adjacent to the head 72 by compressing the spring and thereby providing sufficient distance between the cross pin and the cup member that the stud can be inserted, at an angle, into the grommet. However, the geometry of this arrangement limits the axial length of the grommets 52 which can be used. Specifically, when the axial length of a grommet 52 reaches a certain axial length, the stud 54 cannot be inserted into the grommet even when the cup member 76 is adjacent to the head 32.

The receptacle 56 of the fastener 50 has a generally cylindrical body 82 and a flange 84 projecting radially outward from one end of the body. The receptacle body 82 defines a central opening and has cam and locking surfaces 86 defined at an end opposite the radially outward extending receptacle flange 84. The receptacle flange 84 is placed against and secured to a side of the other panel 60, usually an inner panel, opposite to the side contacting the first panel 58, with the receptacle body 82 extending away from the side of the panel 60 to which the flange is attached. The panels 58 and 60 are brought together so that the stud 54 and the receptacle 56 are in alignment. The head 72 of the stud 54 is engaged by a turning tool, such as a screwdriver, pushed inwardly against the bias of the spring, and turned ¼ turn with the cross pin 74 of the stud in engagement with the cam and locking surfaces 86 of the receptacle 56. This action locks the fastener 50 in place with the two panels 58 and 60 in secure engagement with one another.

The receptacle body 82 defines a central opening 85 and has internal threads throughout its axial length. The receptacle flange 84 is placed against and secured to a side of the other panel 60, usually an inner panel, opposite to the side contacting the first panel 58, with the receptacle body 82 extending away from the side of the panel 60 to which the flange is attached. As can be appreciated from FIGS. 2 and 5, the flange 84 is attached by being retained in a cage 88 having an opening 90 smaller than the outer perimeter of the flange 84 and having ears 92 which are attached to the panel 60, such as by rivets 94. The receptacle 56 further includes a cylindrical barrel member 96 (which is not shown in cross section) having external threads 98 throughout its axial length, the barrel member 96 being sized so that the threads 98 engage the internal threads on the inner surface of the receptacle body 82 in normal threaded engagement. As can be seen from FIGS. 2 and 4, the barrel member 96 also has a central aperture 100 large enough to receive the shaft 70 of the stud 54. Diametrically opposed curved slots 102 each have a closed end and an open end extending through the end of the barrel member 96 facing the grommet 52. The curved slots 102 define the cam and locking surfaces 86, more specifically, cam surfaces leading to apices beyond which the slots 102 curve back toward the end of the barrel member 96 facing the grommet 52 to define locking surfaces for the cross pin 74 of the stud 54. The length of the cross pin 74 is greater than the inner diameter of the barrel member 96 but less than the central opening 85 of the receptacle body 82.

As can be appreciated from FIGS. 2–4, a locking mechanism 104 is provided to prevent rotation of the barrel member 96 relative to the cylindrical body 82 of the receptacle 56 after the barrel member has been set in a desired position. The locking mechanism 104 includes a groove 106, semi-cylindrical in cross section, drilled in the inner annular surface of the receptacle body 82 in a direction generally parallel to the longitudinal axis of the receptacle body and a groove 108, semi-cylindrical in cross section, drilled in the outer annular surface of the barrel member 96 in a direction parallel to the direction of the groove 106 in the receptacle body 82. The grooves 106 and 108 in the receptacle body 82 and the barrel member 96 have the same radius of curvature in cross section. They are in alignment at one point for each rotation of the barrel member 96 relative to the cylindrical body 82. When the barrel member 96 is in the desired position and the grooves 106 and 108 are in alignment, a generally cylindrical roll spring pin 110 is compressed and inserted with a tool into the aligned grooves so that the roll spring pin occupies both grooves and, thereby, prevents rotation of the barrel member 96 relative to the receptacle body 82. Spring roll pins are known devices and typically comprise a strip of spring steel rolled into the shape of a cylinder having a small gap in its circumference. In the relaxed condition of the spring pin, the circumference is larger than the circumference of the opening into which the pin is to be inserted. Therefore, it is compressed, inserted into the opening and released, by which the pin is firmly retained in the opening.

The position of the barrel member 96 in the receptacle body 82 is set so that the cross pin 74 of the stud 54 can reach the apices of the cam and locking surfaces 86 and cause a spring on the stud 54 (FIG. 6) to be compressed when the cross pin is in engagement with the apices. For a stud 54 of a particular length, the relationship of the cross pin 74 and the curved slots 102 of the barrel member 96 will be determined by the total thickness of the two panels 58 and 60, as can be appreciated from FIG. 2. If the total panel thickness is greater than the total thickness of the panels illustrated in FIG. 2, the greater thickness can be accommodated, while using a stud 54 of the same length, by removing the roll spring pin 110, rotating the barrel member 96 so that the action of the threads moves the barrel member axially upward in the receptacle body 82, then by aligning the semi-cylindrical grooves 106 and 108, and reinserting the spring pin 110.

Fasteners employing the adjustable receptacle according to the present invention can be used with conventional grommets, as shown in FIG. 2, or with grommets according to another aspect of the present invention. As can best be seen from FIGS. 6 and 7, the grommet according to the present invention, which is designated generally by the reference numeral 120, has a generally cylindrical body 122, a larger flange 124 extending radially outward from a first body portion 125 at one end of the body 122, a smaller flange 126 directed radially outwardly from a second body portion 127 at the opposite end of the body, a smaller bore 128, and a counterbore 130 defining with the smaller bore a shoulder 132 facing the end of the body 122 having the larger flange 124. Diametrically opposed slots 134 are formed in the cylindrical body 122, extending from a closed end in the second body portion 127 adjacent to the shoulder 132 to an open end extending through the end of the grommet 120 distal to the larger flange 124. Each slot 134 has a width greater than the diameter of the cross pin 74 of the stud 54. As was described earlier, a spring 136 is positioned on the shaft 70 of the stud 54 and is visible in FIG. 6, where it is shown in its relaxed, or expanded, condition. The spring 136 is received in the cup member 76 and, thus, the spring 136 biases the cup member away from the head 72 of the stud 54. The cup member 76 engages the shoulder 132 defined between the smaller bore 128 and the counterbore 130 of the grommet 120. A slot 138 or other formation is defined in the head 72 of the stud 54 to receive a tool, such as a screw driver, for turning the head to engage or disengage the fastener.

A pliers must be used to insert the stud 54 into the grommet 120, and this is accomplished by forcing the cup 76 toward the head 72 of the stud against the bias of the spring 136 with the pliers, while holding the shaft 70 of the stud at an angle to the longitudinal axis of the grommet and inserting the stud into the bores 130 and 128 of the grommet. When the pliers is released, the grommet 120 is captured by the stud 54, since the length of the cross pin 74 of the stud is greater than the inner diameter of at least the smaller bore 128 of the grommet. Without moving the cup 76 toward the head 72 of the stud 54, the stud cannot be inserted in the grommet, even at an angle, because there is not enough distance between the cup 76 and the cross pin 74. It can be appreciated that, for a stud of a particular length, the stud cannot be inserted into a grommet even with the cup moved as close as possible to the head of the stud if the grommet exceeds a certain axial length. However, with the grommet 120 according to the present invention, the stud 54 need be inserted only until the cross pin 74 reaches the closed ends of the slots 134. Although the length of the cross pin 74 is greater than the inner diameter of at least the smaller bore 128 of the grommet body 122, the cross pin can be accommodated in the slots 134. With the slot structure, the axial length of the grommet 120 can be increased, and the stud 54 still inserted, while the distance from the closed end of the slot 134 to the end of the body 122 of the grommet 120 having the larger flange 124 is kept constant. The grommet according to the present invention can be used with the receptacle according to the present invention, and can also be used with conventional receptacles and conventional ¼ turn fasteners.

As can be seen from FIGS. 8 and 9, in a second embodiment of the fastener according to the present invention, all of the parts are the same as with the embodiment of FIGS. 2-7, with the exception of the locking mechanism 104, including the grooves 106 and 108 and the roll spring pin 110. Instead, in the embodiment of FIGS. 8 and 9, the locking mechanism comprises a resilient fixing material, such as nylon, in the form of a strip 140. The resilient fixing strip 140 extends most of the axial length of the barrel 96 and is held in a tight frictional fit in a groove 142 machined through the threads 98 of the barrel 96 in a direction parallel to the axis of the barrel. The threads of the receptacle body 82 which interengage the threads 98 of the barrel project into and deform the resilient fixing strip 140. The resilient engagement between the resilient fixing strip 140 and the threads of the receptacle body 82 prevents rotational movement of the barrel 96 relative to the body 82 when the fastener is either connected or disconnected by the turning of the stud 54 with an appropriate tool. However, the application of a rotational force of a magnitude greater than that required for normal connection or disconnection of the fastener 50 results in the turning of the barrel 96 relative to the body 82. Thus, the barrel 96 can be moved downward in the body 82 upon the application of a tightening force to the stud 54 beyond that required for normal connection of the fastener 50. The barrel 96 can be adjusted upwardly in the body 82 by the application of a force of the same magnitude required for adjusting of the barrel downward in the body. However, application of a force to adjust the barrel 96 upward is best accomplished by removal of the stud 54 and the cup member 76 and insertion of a screwdriver into the upper ends of the curved slots 102 in the barrel 96. The resistance encountered in connecting or disconnecting the fastener 50 according to the present invention is on the order of 4–5 inch pounds. The resilient fixing material, such as the strip 140, provides a resistance to the turning of the barrel 96 on the order of 15–20 inch pounds. Thus, it can be appreciated that the fastener 50 can be connected and disconnected without danger of accidentally moving the barrel 96 relative to the body 82. However, upon the application of a significantly greater force, the barrel 96 does rotate to permit adjustment of the fastener 50.

As can be seen from FIGS. 10 and 11, in a third embodiment according to the present invention, all of the parts and features are the same as in the embodiment of FIGS. 2–7 with the exception that the locking mechanism 104, including the grooves 106 and 108, and the roll spring pin 110 are omitted. Instead, the embodiment of FIGS. 10 and 11 employs a resilient fixing material which is the same in all respects as the locking mechanism of FIGS. 8 and 9 except for the shape of the resilient fixing member. In the embodiment of FIGS. 10 and 11, the resilient fixing element is in the form of a cylinder or pellet 150 secured in a radial bore through the threads 98 of the barrel 96. The pellet 150 projects radially beyond the threads 98 for engagement with the threads of the body 82.

It is understood that the resilient fixing material can take other forms not specifically described and illustrated herein. For example, the resilient fixing material can comprise a coating covering a portion or portions or all of the surface of the threads 98 of the barrel 96, or a portion or portions or all of the surface of the threads of the body 82.

Having thus described the present invention and its preferred embodiments in detail, it will be readily apparent to those skilled in the art that further modifications to the invention may be made without departing from the spirit and scope of the invention as presently claimed.

What is claimed is:

1. A fastener for holding together first and second elements, wherein each element has an aperture for receiving the fastener, a first side in engagement with the other of said elements, and a second side facing away from the other of said elements, comprising:

a grommet having an opening and a radially outward extending flange for engaging the second side of said first element;

a stud including a shaft having opposite ends, a head at one of said ends, a cross pin at the other of said ends, an element movable on said shaft, and a spring device positioned between said movable element and said head; and a receptacle for securement to the second element, said receptacle defining means for receiving the cross pin of said stud, wherein the cross pin has a length greater than the inner diameter of the grommet, said grommet has a first end at which said flange is positioned and a second end, and said grommet defines means for receiving the cross pin between said first and second ends.

2. The fastener of claim 1, wherein said cross pin receiving means comprises diametrically opposed slots having open ends extending through said second end of said grommet.

* * * * *